Nov. 30, 1965 W. F. LODDING ETAL 3,220,619
METERED LIQUID DISPENSING CLOSURE
Filed July 27, 1964 2 Sheets-Sheet 1
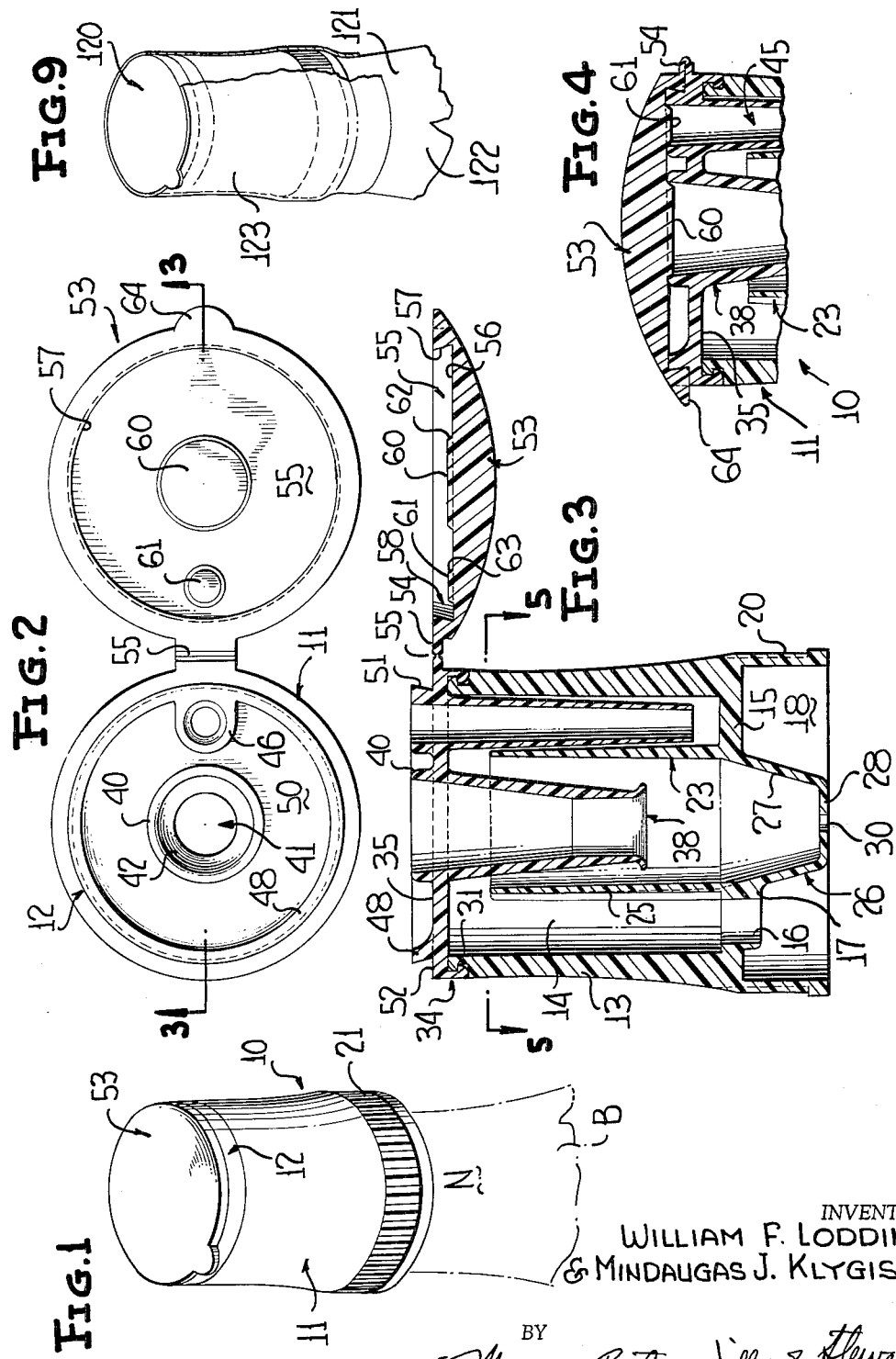
INVENTORS
WILLIAM F. LODDING
& MINDAUGAS J. KLYGIS
BY
Mason, Porter, Diller & Stewart
ATTORNEYS Nov. 30, 1965   W. F. LODDING ETAL   3,220,619
METERED LIQUID DISPENSING CLOSURE
Filed July 27, 1964   2 Sheets-Sheet 2

INVENTORS
WILLIAM F. LODDING
& MINDAUGAS J. KLYGIS
BY
Mason, Porter, Diller & Stewart
ATTORNEYS

United States Patent Office 3,220,619
Patented Nov. 30, 1965

3,220,619
METERED LIQUID DISPENSING CLOSURE
William F. Lodding, Orland Park, and Mindaugas J. Klygis, Chicago, Ill., assignors to Continental Can Company, New York, N.Y., a corporation of New York
Filed July 27, 1964, Ser. No. 385,430
20 Claims. (Cl. 222—416)

This invention relates to a novel plastic dispensing closure for dispensing a metered quantity of liquid from a container with which the closure is associated, and is particularly characterized by being constructed from a maximum of two molded plastic members joined together in sealed relationship.

It is conventional to form closures for dispensing a metered quantity of liquid from a plurality of different elements constructed from different material and securing these elements together by a plurality of fastening means. Such constructions necessarily result in conventional dispensing closures which are relatively intricate in both design and assembly, and are therefore relatively expensive to manufacture. For example, such dispensing closures are presently constructed from as many as twelve or more separate elements including such elements as individual vent tubes, dispensing tubes, siphon tubes, whole or partial housings, gaskets, separate caps, hinge pins for securing the caps to dispensing closures, means for securing the partial housings together, etc.

In accordance with this invention it is the prime object to provide a novel dispensing closure for dispensing a metered quantity of liquid which is relatively simple in construction, assembly and operation, and which overcomes substantially each of the inherent disadvantages in cumbersome, expensive multi-element conventional dispensing closures.

A further object of this invention is to provide a novel dispensing closure for dispensing a metered quantity of liquid, the closure being characterized in that the same is constructed from a maximum of two parts, a first of these parts being a housing defining a chamber and a second of these parts being a closure member closing an uppermost end of the chamber, a partition member closing an end of the chamber opposite the closure member, a siphon tube forming an integral portion of the housing and telescopically receiving a venturi-type dispensing tube forming an integral portion of the closure member, and means removably securing the closure member to an upper portion of the housing in air-tight sealed relationship whereby an accurate measured amount of liquid in a container with which the dispensing closure is associated will be dispensed therefrom during a dispensing operation.

A further object of this invention is to provide a novel dispensing closure of the type described, and further including an overcap integrally hingedly connected to the closure member, and means on the overcap for closing an opening defined by an upper portion of the dispensing tube to prevent the inadvertent or accidental dispensing of liquid from the container.

A further object of this invention is to provide a novel dispensing closure including each of the elements above set forth, and further including means for securing the dispensing closure to a container, the securing means forming an integral part of a lower peripheral skirt of the housing or as an integral plug portion of the partition member adapted for insertion into a pour opening of a container.

A further object of this invention is to provide a novel dispensing closure of the type described in which the overcap and housing include cooperable interlockable means for securing the overcap in the closed position thereof relative to the dispensing tube, but which is readily removable by hinging action to an out-of-the-way dispensing position.

With the above, and other objects in view that will hereinafter appear, the nature of the invention will be more clearly understood by reference to the following detailed description, the appended claims and the several views illustrated in the accompanying drawings.

In the drawings:

FIGURE 1 is a top perspective view of a novel plastic dispensing closure constructed in accordance with this invention and illustrates the dispensing closure attached in the closed position thereof to the finish of a bottle.

FIGURE 2 is a top plan view of the dispensing closure and illustrates an overcap in its open or dispensing position.

FIGURE 3 is an enlarged sectional view taken along line 3—3 of FIGURE 2, and illustrates the structural details of the dispensing closure.

FIGURE 4 is a fragmentary sectional view similar to FIGURE 3, and illustrates the interlocking engagement between the overcap and a portion of a closure member of the dispensing closure.

FIGURE 9 is a top perspective view of the plastic dispensing closure of FIGURES 1 through 6, and illustrates a seal partially broken away for clarity providing a hermetic seal between the closure and a bottle neck or finish.

Figure 5:
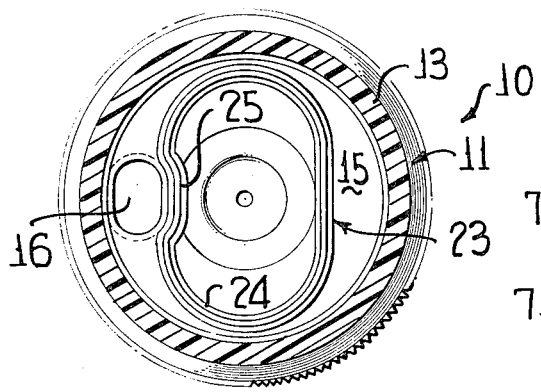
FIGURE 5 is a sectional view taken along line 5—5 of FIGURE 3, and illustrates the generally oval-shaped configuration of a siphon tube forming an integral part of a housing of the closure.
Figure 6:
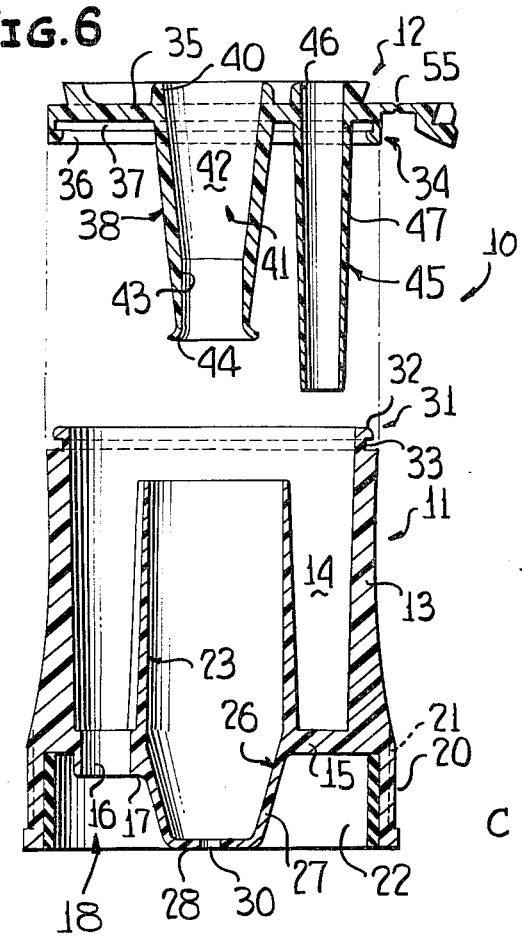
FIGURE 6 is an exploded fragmentary axial sectional view of the dispensing closure, and illustrates the closure member and the housing of the two-piece closure prior to the assembly thereof.

A novel dispensing closure for dispensing a metered quantity of liquid is best illustrated in FIGURES 1 through 6 of the drawings, and is generally designated by the reference numeral 10. The dispensing closure 10 is of a two-piece construction comprising an outer member or housing 11 and a closure member 12. The housing 11 and the closure member 12 of the dispensing closure 10 are each preferably constructed from plastic material such as polyethylene, polystyrene or similar thermoplastic material, and these elements are preferably formed by a conventional injection molding process.

The outer housing 11 comprises a substantially cylindrical wall 13 defining an inner liquid chamber 14. The housing 11 is closed at a lower end thereof by an integral partition member or wall 15 provided with a generally oval-shaped opening 16 (FIGURE 5) opening from the chamber 14 through a thickened portion 17 (FIGURES 3 and 6) of the partition member 15 into a recess 18 defined by a continuous peripheral skirt portion 20 of the housing wall 13. The skirt portion 20 is preferably knurled, as at 21 (FIGURES 1 and 5) to facilitate manual grasping of the dispensing closure 10 for securing the dispensing closure 10 to or removing the dispensing closure from a neck or finish N of a bottle B (FIGURE 1). The skirt 20 of the housing wall 13 is flexible and provides a friction fit with the bottle neck N. An annular gasket 22 (FIGURE 6) is conventionally secured in the recess 18 of the housing 11 in intimate engagement with the skirt 20 to insure a positive airtight seal between the dispensing closure 10 and the bottle B.

A siphon tube 23 forms an integral upward extension of the partition member 15. The siphon tube 23 tapers slightly radially inwardly and upwardly away from the partition member 15 and is disposed generally axially of the housing wall 13. As is best illustrated in FIGURE 5 of the drawings, the siphon tube 23 is generally oval-shaped in top plan and a wall 24 defining the siphon tube 23 has a radially inwardly offset wall portion 25 corresponding generally to the outline of the wall portion (unnumbered) defining the opening or aperture 16 (FIGURE 5).

A lower portion 26 forms an integral extension of the siphon tube 23 and the partition member 15. The portion 26 includes a downwardly converging wall 27 terminating in an end wall 28 which is axially apertured at 30. The aperture 30 is slightly smaller than the aperture or opening 16 in the thickened portion 17 of the partition member 15 and is circular in transverse section, as is best illustrated in FIGURE 5 of the drawings.

An upper portion (unnumbered) of the wall 13 of the housing 11 is provided with means 31 in the form of a radially outwardly directed circumferential bead 32 and a groove 33 therebeneath for cooperating with similar means 34 forming an integral portion of an end wall 35 of the closure member 12. The means 34 include a radially inwardly directed circumferential bead 36 and a circumferential groove 37 which removably sealably interlocks in an air-tight manner with the respective groove 33 and bead 32 of the means 31, in a manner clearly illustrated in FIGURE 3 of the drawings.

The closure member 12 further includes a dispensing tube 38 having an upper portion 40 opening upwardly beyond the end wall 35, and a major portion (unnumbered) projecting axially downwardly in internally telescopic spaced relationship relative to the siphon tube 23 in the assembled position of the closure member 12 and the housing 11 (FIGURE 3). The dispensing tube 38 includes a port or channel 41 defined by a downwardly converging frustoconical surface 42 terminating at a generally cylindrical surface portion 43 which terminates in a radially outwardly and downwardly flare surface portion 44. The surface portions 42–44 thus define a venturi-type dispensing tube which provides high liquid dispensing velocities resulting in extremely rapid siphoning action, and also prevents adherence of the liquid being dispensed to the surfaces 42–44 of the port 41.

A vent tube 45 similarly includes an upper portion 46 opening outwardly beyond the end wall 35 and a relatively longer body portion 47 projecting into the chamber 14 and terminating short of the partition member 15 of the housing 11, as is best illustrated in FIGURE 3 of the drawings.

The end wall 35 of the closure member 12 includes an upwardly directed peripheral wall portion 48 which defines a generally annular recess 50 (FIGURE 2) with the upper portion 40 of the dispensing tube 38. A circumferential face 51 of the peripheral wall portion 48 converges radially inwardly and downwardly toward the axis of the dispensing closure 10 and merges with an upwardly directed seating surface or seat 52.

An overcap or closure cap 53 of a generally dome-shaped configuration is integrally joined to the end wall 35 of the closure member 12 by a generally flat radial extension 54 of the end wall 35 (FIGURE 3). The radial extension 54 of the end wall 35 is relieved at 55 by means of opposed shallow grooves (unnumbered) to increase the hinging action of the overcap 53 about the relief portion 55 from the open dispensing position shown in FIGURE 3 to the closed non-dispensing position illustrated in FIGURE 4.

The overcap 53 is provided with a generally circular recess 55 (FIGURES 2 and 3) defined by a generally horizontal surface portion 56 and an internal angular circumferential surface portion 57. The surface portions 56 and 57 set off a generally circumferential groove 58 which receives the peripheral wall portion 48 of the end wall 35 as shown in FIGURE 4 to removably interlockably secure the overcap 53 in the non-dispensing position thereof relative to the closure member 12. In this non-dispensing position a portion (unnumbered) of the overcap 53 seats in sealing relationship upon the seat 52 of the end wall 35 to form a secondary seal preventing liquid from the bottle B from escaping outwardly of the chamber 14 through either the dispensing tube 38, the vent tube 45 or both of these tubes.

A primary seal is effected between the overcap 53 and the dispensing and vent tubes 38 and 45 respectively by respective sealing bosses or projections 60 and 61 respectively. The boss 60 is substantially circular, as is the boss 61 (FIGURE 2). The boss 60 is disposed axially of the overcap 53 and is thus received in the opening (unnumbered) defined by the upper portion of the dispensing tube 38 when the overcap 53 is in the non-dispensing position thereof (FIGURE 4).

The boss 61 is offset from the axis of the overcap 53 a distance equal to the offsetting of the axis of the vent tube 45 and is thus received in the opening (unnumbered) defined by the upper portion 46 of the vent tube 45 in the non-dispensing position of the overcap 53. The bosses 60 and 61 are provided with respective conical circumferential sealing surfaces 62 and 63 which frictionally engage the upper portions 40, 46 of the respective tubes 38, 45 under the influence of the locking action between the groove 58 of the overcap 53 and the peripheral wall portion 48 of the closure member 12.

A thumb tab 64 (FIGURES 1 and 4) forms an integral portion of the overcap 53, and is positioned diametrically opposite the radial extension 54 of the closure member end wall 35. The tab 64 projects radially outwardly beyond the end wall 35 and the housing 11 in the non-dispensing position of the overcap 53 and is thus readily accessible from beneath by a person's thumb to apply an upwardly directed force to unlock the overcap 53 prior to a dispensing operation performed by the dispensing closure 10.

With the dispensing closure 10 in the position illustrated in FIGURE 1 and FIGURE 3 of the drawings, but with the overcap unlocked in FIGURE 1, a dispensing operation is initiated by inverting the bottle or container B. Liquid (not shown) in the bottle B flows into the chamber 14 through the oval-shaped opening 16 in the partition member 15 and displaces air in the chamber 14 through the siphon tube 23 and the opening 30 into the bottle B. The liquid continues to rise in the chamber 14, noting that the dispensing closure 10 and the bottle B are still inverted. When the liquid pouring into the chamber 14 rises above the level of the dispensing tube 38, automatic siphon flow is established and liquid is drawn upwardly between the dispensing tube 38 and the siphon tube 23, and outwardly through the dispensing tube 38 until the liquid level drops below the rim (unnumbered) of the siphon tube 23 whereupon flow ceases and the liquid level in the chamber 14 again beings to rise to initiate another dispensing cycle of the dispensing closure 10.

The time required for the liquid in the bottle B to be dispensed therefrom by the dispensing closure 10 will vary, depending upon such factors as the internal dimension of the dispensing tube 38, the siphon tube 23, the size of the chamber 14, the size of the openings 30, 16, the viscosity of the liquid being dispensed, surface tension, etc. However, substantially the same quantity of liquid will be dispensed from the dispensing closure 10 during each repeated dispensing cycle of the dispensing closure particularly because of the air-tight connection between the means 31, 34, which prevents air from entering the dispensing closure 10 at this point which might otherwise prevent intermittent dispensing and cause continuous pouring of the liquid. The rapid dispensing of the liquid is facilitated by the venturi-type dispensing tube 38, as was heretofore noted, and the integral construction of the partition member 15, the skirt 20 and the portion 26 of the siphon tube 23 prevents the development of liquid meniscus build-up which otherwise occurs in conventional non-integral dispensing closures when a viscous or foamy liquid is dispensed therefrom.

In accordance with this invention, it is also preferable to provide the dispensing closure 10 with suitable means to prevent any possible introduction of liquid into the chamber 14 from the bottle B during shipment, and to prevent the introduction of foreign matter into the chamber 14 when any such dispensing closures are shipped without being secured to an associated container. For example, while the overcap 53 prevents contaminants from entering the chamber 14 through the dispensing tube 38 and the vent tube 45 when in the non-dispensing position (FIGURE 4), the openings or apertures 16, 30 allow free access of such contaminants into the chamber 14.

Figure 7:
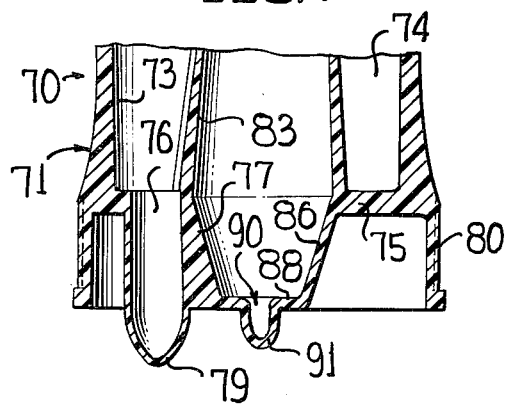
FIGURE 7 is a fragmentary sectional view of a dispensing closure similar to the dispensing closure of FIGURES 1 through 6, and illustrates conical portions of a partition member closing a liquid chamber of the dispensing closure against the entrance thereinto of liquid or contaminants.

A portion of a novel dispensing closure, substantially identical to the dispensing closure 10 of FIGURES 1 through 6, is illustrated in FIGURE 7 to which attention is now directed. The dispensing closure of FIGURE 7 is generally referred to by the reference numeral 70 and includes a closure member (not shown) identical to the closure member 12 of the dispensing closure 10. The dispensing closure 70 further includes a housing 71 having a generally cylindrical wall 73 defining a liquid chamber 74. The wall 73 of the housing 71 terminates at an upper portion in locking means (not shown) identical to the locking means 31 of the housing 11.

A partition member 75 forming an integral portion of the housing 71 is provided with a circular or oval-shaped opening or port 76 formed in a thickened portion 77 of the partition member 75. The port 76 is normally closed at a lowermost end portion by a generally conical portion 79 projecting beneath a peripheral skirt portion 80. The conical portion 79 thus prevents contaminants from entering through the port 76 into the chamber 74.

The partition member 75 further includes a siphon tube 83 corresponding in structure and function to the siphon tube 23 of the dispensing closure 10. A lowermost portion 86 of the siphon tube 83 merges with the thickened portion 77, and both the portions 77 and 86 terminate in a bottom or end wall 88 having an opening or port 90 normally closed by a conical portion 91. The conical portion 91, like the conical portion 79, closes the port 90 and thus prevents contaminants from entering the chamber 74 through the port 90 and the siphon tube 83. The conical portion 91 depends below the skirt portion 80, and both of the conical portions 79, 91 can be severed by a knife or similar cutting implement prior to assembling the dispensing closure 70 on a container filled with liquid to be dispensed in the manner heretofore described.

Figure 8:
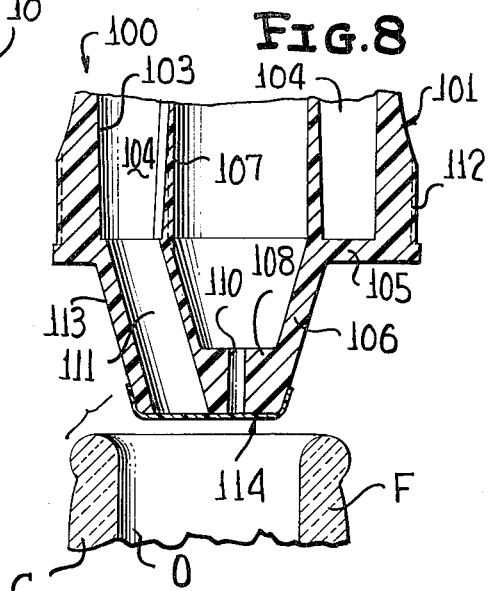
FIGURE 8 is a fragmentary sectional view of a dispensing closure constructed in accordance with this invention and a bottle finish with which the closure is associated, and illustrates a partition forming a plug portion of a housing for receipt into an opening of the bottle finish.

A dispensing closure 100 (FIGURE 8) is similar to the dispensing closures 10 and 70, and differs therefrom solely in the particular construction of a lower portion (unnumbered) of a housing 101. The housing 101 includes a generally cylindrical wall 103 which defines a liquid chamber 104 closed at a lower end portion by a partition member 105. The partition member 105 includes a generally inverted frusto-conical portion 106 forming a downwardly projecting extension of a siphon tube 107. The portion 106 terminates in a thickened bottom wall or bottom portion 108 provided with an axial port or opening 110 in fluid communication with the chamber 104 through the siphon tube 107. A similar port or opening 111 opens through the bottom end wall 108 of the portion 106 into the chamber 104. The ports 110, 111 correspond in function to the respective ports or openings 30, 16 of the dispensing closure 10. However, unlike the dispensing closure 10, a peripheral skirt portion 112 of the housing 101 terminates above the portion 105 of the partition member 105 thus, the skirt portion 112 is not employed or provided with suitable friction or other means for securing the dispensing closure 100 to a neck or finish F of a bottle or similar container C having a pour opening O. The securement of the dispensing closure 100 to the bottle C is achieved by the portion 106 of the partition member 105 whose outermost surface 113 is friction or force-fit into the opening O. When thus secured to the bottle C, the dispensing closure 100 dispenses a metered quantity of liquid (not shown) in the bottle C in the manner heretofore described.

The dispensing closure 100 is also preferably provided with means 114 for sealing the ports 110, 111 to prevent liquid in the bottle from entering the chamber 104, or to prevent contaminants from entering the chamber 104 through the ports 110, 111 when dispensing closures corresponding to the dispensing closure 100 are shipped without being attached or secured to an associated container. The means 114 is preferably a strip of plastic material which is heat sealed to the bottom wall 108 of the portion 106 in overlying relationship to the ports 110, 111. The means 114 can similarly be aluminum foil or other relatively liquid impermeable sheet material which is adhesively bonded to the bottom wall 108, or can be a metallic cap-like member friction-fit upon the end portion 106. In all cases, the means 114 is removed prior to the performance of a dispensing operation by the dispensing closure 100.

Referring in particular to FIGURE 9 of the drawings, a dispensing closure 120, such as any one of the dispensing closures 10, 70 and 100 heretofore described, is secured to a neck 121 of a bottle 122. The dispensing closure 120 is sealed by means corresponding to the overcap 53, the conical portions 79, 91 (FIGURE 7) the means 114 (FIGURE 8) or the equivalence thereof. In addition, a sheet of aluminum foil or thermoplastic material, such as polyethylene or similar polymer material, is heat-shrunk to wholly overlie and encompass the entire dispensing closure 120 and a portion (unnumbered) of the bottle neck 121. In this manner, the dispensing closure 120 is not only sealed against the entry of liquid into the interior of a chamber thereof (not shown), but the seal 123 maintains the dispensing closure 120 and the bottle 121 in a tamper-proof condition.

From the foregoing, it will be seen that novel and advantageous provisions have been made by carrying out the desired end. However, attention is again directed to the fact that additional variations may be made in this invention without departing from the spirit and scope thereof as defined in the appended claims.

We claim:

1. A dispensing closure for dispensing a metered quantity of liquid from a container comprising an outer housing and a closure member, said closure member having an end wall, a dispensing tube opening through said end wall, a partition member, a siphon tube opening through said partition member and being positioned in telescopic spaced relation relative to said dispensing tube, a chamber defined by said housing, end wall and partition member, means forming an opening through said partition member into said chamber, means forming an opening through said end wall into said chamber, each of said opening forming means and said tubes being constructed and arranged to dispense a metered quantity of liquid from a container to which the dispensing closure is attached, and means removably securing said closure member to said outer housing.

2. The dispensing closure as defined in claim 1 wherein said closure member and said outer housing are each of a one-piece integral construction whereby said closure member and outer housing are interchangeable with other similar housings and closure members respectively to vary the quantity of metered liquid.

3. The dispensing closure as defined in claim 1 wherein said dispensing tube is a venturi-type tube.

4. The dispensing closure as defined in claim 1 including means sealing at least one of said opening forming means to prevent substances from entering said chamber.

5. The dispensing closure as defined in claim 1 wherein said partition member includes means for securing said dispensing closure to a container.

6. The dispensing closure as defined in claim 1 wherein said closure member includes an overcap hingedly connected thereto, and means on said overcap for closing said dispensing tube and said opening forming means in said end wall.

7. The dispensing closure as defined in claim 1 wherein said closure member and said outer housing are each of a one-piece integral molded plastic construction.

8. A dispensing closure for dispensing a metered quantity of liquid from a container comprising an outer housing and a closure member, said outer housing comprising a wall defining a chamber in said housing, a partition member closing a lower portion of said chamber, said partition member having an aperture therethrough, a siphon tube opening through said partition member, said siphon tube being generally axially located relative to said housing, said siphon tube having an upper end portion terminating in spaced relationship to said closure member; said closure member comprising an end wall, a dispensing tube and a vent tube carried by said end wall, each of said dispensing and vent tubes having lower end portions terminating in spaced relationship to said partition member, said dispensing tube being telescopically received in said siphon tube, and means for removably securing said closure member to said outer housing.

9. The dispensing closure as defined in claim 8 wherein said closure member and said outer housing are each of a one-piece molded plastic construction.

10. The dispensing closure as defined in claim 8 wherein said securing means are complementary interlockable groove and bead means forming parts of said housing and said closure member.

11. The dispensing closure as defined in claim 8 wherein said closure member and said outer housing are each of a one-piece molded plastic construction, and said securing means are complementary interlockable groove and bead means forming parts of said housing and said closure member.

12. The dispensing closure as defined in claim 8 wherein said partition member includes means for securing said dispensing closure to a container.

13. The dispensing closure as defined in claim 8 wherein said outer housing includes an integral peripheral skirt portion, and means carried by said skirt portion for securing said dispensing closure to a container.

14. The dispensing closure as defined in claim 8 wherein said dispensing tube projects beyond said end wall and terminates at a closed end portion beyond said end wall, said closed end portion being adapted for removal prior to a dispensing operation.

15. The dispensing closure as defined in claim 8 wherein said dispensing tube projects beyond said end wall and terminates at an opened end portion beyond said end wall.

16. The dispensing closure as defined in claim 9 wherein said dispensing tube is a venturi-type tube having a lower end portion flaring radially outwardly and downwardly toward said partition member.

17. The dispensing closure as defined in claim 9 wherein said siphon tube is generally oval-shaped in transverse section and said dispensing tube is a venturi-type tube terminating at a lower end portion thereof in a radially downwardly and outwardly directed flare.

18. The dispensing closure as defined in claim 15 wherein said closure member includes an overcap hingedly connected thereto, and means on said overcap for closing said dispensing tube opening.

19. The dispensing closure as defined in claim 18 including complementary interlockable bead and groove means for removably securing said overcap in sealed relationship to said closure member.

20. The dispensing closure as defined in claim 19 wherein said partition member includes a portion tapering radially inwardly and downwardly to define a plug portion for insertion into an opening of a container.

References Cited by the Examiner

UNITED STATES PATENTS

| | | | |
|---|---|---|---|
| 2,209,947 | 8/1940 | Conrade et al. | 222—424 X |
| 2,442,133 | 5/1948 | Legarra | 222—416 X |
| 2,714,977 | 8/1955 | Davis | 222—424.5 |
| 2,778,545 | 1/1957 | Sapia | 222—482 |
| 3,081,008 | 3/1963 | Hester | 222—416 |
| 3,104,039 | 9/1963 | Dike | 222—484 X |
| 3,117,701 | 1/1964 | Stull | 222—484 X |

FOREIGN PATENTS 109,586  1/1940  Australia.

LOUIS J. DEMBO, *Primary Examiner.*